United States Patent
Beneyton et al.

(10) Patent No.: US 8,530,331 B2
(45) Date of Patent: Sep. 10, 2013

(54) PROCESS FOR ASSEMBLING SUBSTRATES WITH LOW-TEMPERATURE HEAT TREATMENTS

(75) Inventors: Remi Beneyton, Grenoble (FR); Hubert Moriceau, Saint Egreve (FR); Frank Fournel, Villard-Bonnot (FR); Francois Rieutord, Saint Egreve (FR); Yannick Le Tiec, Crolles (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 13/273,982

(22) Filed: Oct. 14, 2011

(65) Prior Publication Data

US 2012/0088352 A1 Apr. 12, 2012

Related U.S. Application Data

(63) Continuation of application No. 12/296,250, filed as application No. PCT/EP2007/053428 on Apr. 6, 2007, now abandoned.

(30) Foreign Application Priority Data

Apr. 10, 2006 (FR) ...................... 06 51290

(51) Int. Cl.
*H01L 21/30* (2006.01)
(52) U.S. Cl.
USPC ................................. 438/455; 257/E21.122
(58) Field of Classification Search
USPC ............ 438/455, 459; 257/E21.122
See application file for complete search history.

(56) References Cited

U.S. PATENT DOCUMENTS

| 5,152,857 A | 10/1992 | Ito et al. |
| 5,395,788 A | 3/1995 | Abe et al. |
| 5,514,235 A | 5/1996 | Mitani et al. |
| 5,539,245 A | 7/1996 | Imura et al. |
| 5,834,812 A | 11/1998 | Golland et al. |
| 5,869,386 A | 2/1999 | Hamajima et al. |
| 5,877,070 A | 3/1999 | Goesele et al. |
| 5,937,312 A | 8/1999 | Iyer et al. |
| 6,010,579 A | 1/2000 | Henley et al. |
| 6,303,468 B1 | 10/2001 | Aspar et al. |

(Continued)

FOREIGN PATENT DOCUMENTS

| DE | 199 43 101 A1 | 4/2001 |
| EP | 0 451 993 A2 | 10/1991 |

(Continued)

OTHER PUBLICATIONS

Zhu et al., "Formation of silicon-on-diamond by direct bonding of plasma-synthesized diamond-like carbon to silicon", Applied Physics Letters, vol. 85, No. 13, Sep. 27, 2004.

(Continued)

*Primary Examiner* — Brook Kebede
(74) *Attorney, Agent, or Firm* — Pearne & Gordon LLP

(57) ABSTRACT

The invention relates to a process for producing a bond between a first and a second substrate. The process includes preparing surfaces of the substrates to be assembled, and attaching the surfaces to form an assembly of these two surfaces, by direct molecular bonding. The assembly is then heat treated, which includes maintaining the temperature within the range of 50° C. to 100° C. for at least one hour.

31 Claims, 5 Drawing Sheets

(56) References Cited

U.S. PATENT DOCUMENTS

| | | |
|---|---|---|
| 6,309,950 B1 | 10/2001 | Forbes |
| 6,326,279 B1 | 12/2001 | Kakizaki et al. |
| 6,387,815 B2 | 5/2002 | Sakamoto |
| 6,624,047 B1 | 9/2003 | Sakaguchi et al. |
| 6,632,724 B2 | 10/2003 | Henley et al. |
| 6,664,169 B1 | 12/2003 | Iwasaki et al. |
| 6,815,309 B2 * | 11/2004 | Letertre et al. ............ 438/406 |
| 6,828,216 B2 | 12/2004 | Schwarzenbach et al. |
| 6,838,358 B2 | 1/2005 | Maurice et al. |
| 6,841,848 B2 | 1/2005 | MacNamara et al. |
| 6,936,523 B2 * | 8/2005 | Berne et al. ............ 438/458 |
| 7,205,211 B2 | 4/2007 | Aspar et al. |
| 2002/0068419 A1 | 6/2002 | Sakaguchi et al. |
| 2002/0187595 A1 | 12/2002 | Walitzki et al. |
| 2003/0008478 A1 | 1/2003 | Abe et al. |
| 2003/0092244 A1 | 5/2003 | Oi et al. |
| 2003/0094674 A1 | 5/2003 | Ipposhi et al. |
| 2003/0113984 A1 | 6/2003 | Okada et al. |
| 2004/0055894 A1 | 3/2004 | Iwasaki et al. |
| 2004/0206444 A1 | 10/2004 | Letertre et al. |
| 2004/0212557 A1 | 10/2004 | Koo et al. |
| 2006/0055003 A1 | 3/2006 | Tomita et al. |

FOREIGN PATENT DOCUMENTS

| | | |
|---|---|---|
| EP | 0 854 500 A1 | 7/1998 |
| EP | 0 860 862 A2 | 8/1998 |
| EP | 0 935 280 A1 | 8/1999 |
| EP | 0 964 436 A2 | 12/1999 |
| EP | 1 026 728 A2 | 8/2000 |
| EP | 1 059 663 A2 | 12/2000 |
| EP | 1 189 266 A1 | 3/2002 |
| EP | 1 298 713 A1 | 4/2003 |
| EP | 1 507 292 A1 | 2/2005 |
| EP | 1 887 613 A1 | 2/2008 |
| FR | 2 837 981 A1 | 10/2003 |
| FR | 2 860 842 A1 | 4/2005 |
| FR | 2 935 535 A1 | 3/2010 |
| JP | 62-179110 A | 8/1987 |
| JP | 64-089346 A | 4/1989 |
| JP | 02-194519 A | 8/1990 |
| JP | 03-089519 A | 4/1991 |
| JP | 07-045485 A | 2/1995 |
| JP | 09-017984 A | 1/1997 |
| JP | 11-017701 A | 1/1999 |
| JP | 11-354761 A | 12/1999 |
| JP | 2000-173961 A | 6/2000 |
| JP | 2001-144274 A | 5/2001 |
| JP | 2003-078115 A | 3/2003 |
| WO | 2004/008525 A1 | 1/2004 |
| WO | 2004/081974 A2 | 9/2004 |
| WO | 2004/081974 A3 | 9/2004 |
| WO | 2010/026006 A1 | 3/2010 |

OTHER PUBLICATIONS

Aspar et al., "Silicon Wafer Bonding Technology for VLSI adn MEMS applications", INSPEC, Institute of Electrical Engineers, London, 2002, Chapter 3, pp. 35-51.

International Search Report for PCT/EP2007/053428 dated Jun. 5, 2007.

French Search Report for application FR 0651290 dated Jan. 5, 2007.

* cited by examiner

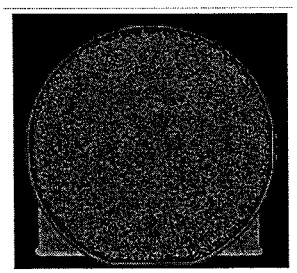
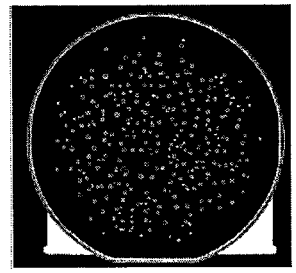
FIG. 5A  FIG. 5B
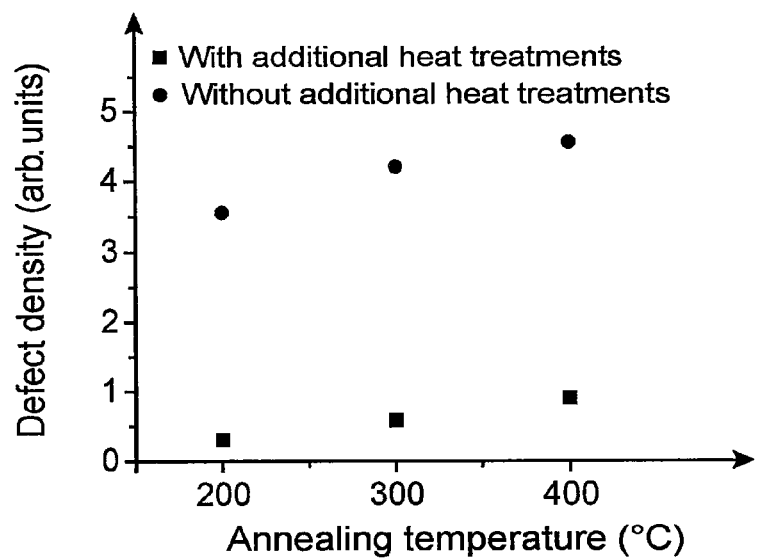
FIG. 6
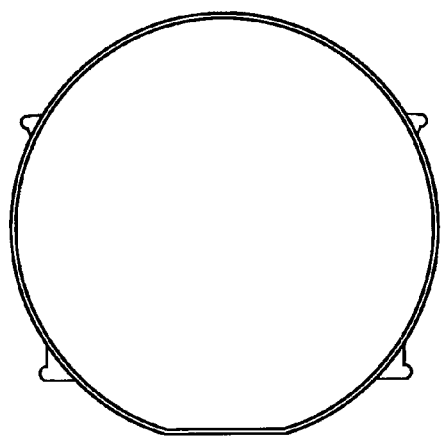
FIG. 7

PROCESS FOR ASSEMBLING SUBSTRATES WITH LOW-TEMPERATURE HEAT TREATMENTS

TECHNICAL FIELD AND PRIOR ART

The invention relates to techniques for assembling substrates.

In general, a bond between two substrates or surfaces can be obtained after a preparation of the surfaces giving them a hydrophilic or hydrophobic character.

The use of heat treatments to reinforce the direct bonding can cause, for a certain number of bonded structures, the appearance of defects at the bonding interface. These defects are due to the degassing of by-products of the molecular bonding reaction: for example, water, hydrogen or hydrocarbon molecules.

For a certain number of bonded structures, it is known that these defects can be resorbed by heat treatments performed at very high temperatures. These temperatures are, for example, between 900° C. and 1300° C. and are based on the preparation of surfaces before bonding. Unfortunately, for other bonded structures, this solution cannot be used.

The limitation of the surface oxide thickness or the presence of various materials facilitates the appearance of defects at the bonding interface.

In the case of thin films (with a thickness below around ten µm or several dozen nm), heat treatments, at temperatures below 1000° C., for example between 600° C. and 800° C., cause the formation of bonding defects in the form of blisters or zones without adherent film. These defects cannot be suppressed by higher-temperature heat treatments. For example, the bursting of bubbles is promoted by the fineness of the layers. These defects make the structures produced unusable. Currently, this phenomenon limits the production of oxide film structures, embedded at the bonding interface, that are fine (thickness below 50 nm) or ultra-fine or even Si layers directly bonded to Si plates.

Similarly, for heterostructures (for example P-doped Si bonded to N-doped Si), heat treatments cause the formation of bonding defects under certain conditions. A high-temperature heat treatment (1000° C.) would cause interdiffusion of the doping agents.

For certain heterostructures, if the damage is excessive in heat treatments within the temperature range below 800° C., this damage can no longer be repaired by a treatment between 1100° C. and 1300° C.

When the heat treatments at higher temperatures cannot be used (incompatibility with the component production process in progress, for example), the bonding defects are then prohibitive.

This therefore raises the problem of reducing or even eliminating, in the case of (direct) molecular bonding, the defects due to degassing at the bonding interface.

The solutions currently used to overcome the formation of defects involve primarily the removal of water at the bonding interface by using, in particular, ultra high vacuum (UHV) bonding techniques. However, these techniques are not suitable for industrial use. There are also techniques that consist of forming channels at the bonding interface in order to evacuate the by-products of the molecular bonding reaction. Unfortunately, such techniques are destructive and present usage problems.

A problem is therefore to find a treatment solution for reducing defects that enables industrial implementation while using the entire surface.

DESCRIPTION OF THE INVENTION

According to the invention, a process for producing a bond between a first and a second substrate comprises:
a) a step of preparing surfaces to be assembled,
b) an assembly of these two surfaces, by direct molecular bonding,
c) a heat treatment step involving at least maintaining the temperature of the surface or of the bonding interface within the range of 50° C. to 100° C. for at least one hour.

Step c) also comprises, after the step of maintaining the temperature within the range [50 to 100° C.] for at least one hour, a step of maintaining the temperature within the range strictly above 100° C., and below 500° C. (i.e. within the range ]100° C. to 500° C.]) for at least one hour.

The term "substrate" refers to a massive substrate or a substrate consisting of a stack of a plurality of layers of different types.

This heat treatment according to the invention enables good preparation of the conditions for degassing the surfaces in contact by molecular adhesion.

It makes it possible to minimise the defect density at the bonding interface. At lower temperatures, such a heat treatment makes it possible to more easily eliminate the by-products of the degassing of the interface, by diffusion at the bonding interface.

The standard heat treatments, at higher temperatures, make it possible to increase the bonding energies of structures, and/or to create a fracture in a zone implanted by one (or more) species, for example gaseous, prior to the bonding. A treatment according to the invention can therefore be a complement to the standard heat treatments, at higher temperatures, which reinforce the bonding.

Treatment steps at one or more temperature(s) above 100° C. can also have been performed prior to a treatment according to step c) of the invention.

According to one embodiment, the invention involves the use of successive or cumulative heat treatments, by levels, for example starting at low temperatures, below 100° C. or 200° C.

A level can comprise a ramp and the actual level temperature, the temperature at which the system is maintained for a certain period. All of these parameters (temperature ramp as a function of time, temperatures, duration of levels) may vary in relatively wide ranges.

For example:
a ramp can be as slow as 0.1° C./min,
the successive temperatures can be spaced by 1° C. or by several ° C. only,
the duration of a level can be as short as several tenths of a second and as long as several hours.

Such a multi-level treatment makes it possible to progressively raise the temperature from the low range of 50° C. to 100° C., and further promotes the elimination of interface degassing by-products.

The invention also relates to a process for producing a bond between a first and second substrate, comprising:
an assembly of these two surfaces, by direct molecular bonding,
a heat treatment step, by successive or cumulative levels.

Such a treatment makes it possible to reduce the defect density at the bonding interface.

Again, a level can comprise a ramp and the actual level temperature, the temperature at which the system is maintained for a certain period. All of these parameters (temperature ramp as a function of time, temperatures, duration of levels) may vary in relatively wide ranges.

For example:
    a ramp can be as slow as 0.1° C./min,
    the successive temperatures can be spaced by 1° C. or by several ° C. only,
    the duration of a level can be as short as several tenths of a second and as long as several hours.

Such a multi-level treatment makes it possible to progressively raise the temperature, for example from a low range such as the range of 50° C. to 100° C., and promotes the elimination of interface degassing by-products.

One of the levels is, for example, around 100° C. for at least 3 or at least 4 or at least 5 hours.

Regardless of the embodiment of the invention, at least one of the surfaces to be assembled may have previously been subjected to a preparation step for the purpose of assembly, for example a treatment step giving it a hydrophilic or hydrophobic character.

In every case, the assembly can be performed by bonding, under a controlled atmosphere.

The heat treatments according to the invention, by successive or cumulative levels, can be performed at progressive temperatures. Increases or levels at increasing temperatures can be performed, optionally with returns to a lower temperature, for example room temperature, between two levels.

The invention therefore relates in particular to the use of specific heat treatments, short or long, but successive, at low temperatures, preferably below 200° C. or 100° C., as a complement to the standard heat treatments.

For example, specific heat treatments are carried out, with each level lasting around two hours, successively at the following temperature levels: 50° C., then 100° C., then 125° C., then 150° C., and finally 200° C.

According to another example, heat treatments according to the invention are carried out cumulatively. For example, a first level is performed for two hours at 100° C.; then, the temperature is returned to room temperature, then maintained at a second level, for two hours, at 150° C. It is then returned to room temperature, then again maintained at a third level, for two hours, but at 200° C. The temperature is then returned to room temperature.

These successive heat treatments can in particular be adjusted by modifying the speeds (or ramps) of increase (or decrease) in temperature, until the desired temperature is reached.

Advantageously, slow increase (or decrease) speeds will be used. For example, speeds below 5° C. per minute, or below 1° C. per minute, or below 0.1° C. per minute, will be chosen.

These heat treatments, successive or cumulative, can be used in combination with effective surface preparations making it possible to obtain structures free of defects at the bonding interface of the hydrophilic or hydrophobic surfaces. These treatments can be a series of surface preparations such as plasmas, or rapid annealings, or bonding environments under various atmospheres and various pressures or temperature bondings.

Heat treatments according to the invention can be followed, for example uninterruptedly, by one or more heat treatments, at one or more temperatures, for example, above the heat treatment temperatures according to the invention, in particular for the purpose of energy reinforcement (bonding).

The invention also relates to a process for producing a thin film on a first substrate, comprising a process for producing a bond between the first substrate and a second substrate as described above, then a step of thinning the second substrate.

The thinning step can be performed by chemical and/or mechanical thinning, or by fracture of the second substrate.

In the latter case, the second substrate can be pre-implanted by one (or more) species, advantageously gaseous, in order to create a zone of weakness or fracture. This species is preferably implanted at a dose above the minimum dose enabling the fracture.

For example, the species can be hydrogen.

The implantation can be ionic.

In the case of a crystalline plate, for example made of a semiconductor material such as silicon, the implantation can be performed at a dose above the minimum dose. The fracture can then be induced at a temperature below the temperature normally necessary to cause the fracture at the minimum dose.

If the species implanted is hydrogen, the dose implanted will be, for example, greater than or equal to $6 \times 10^{16}$ $H^+ \cdot cm^{-2}$.

Even for "standard" doses (and therefore not only in the case of an overdose), a heat treatment according to the invention has a benefit, in particular for the "Smart Cut®" process, by limiting the number of defects.

A process according to the invention is particularly suitable for the assembly of two silicon substrates, or two silicon dioxide substrates (or substrates covered with silicon dioxide), or a substrate made of (or covered by) silicon dioxide and a silicon substrate.

A process according to the invention makes it possible in particular to obtain a thin (thickness below 50 nm) or even ultra-fine oxide film, embedded at the bonding interface.

A process according to the invention also makes it possible to obtain very thin layers of Si (thickness below 150 nm) or of SiO2 (thickness below 50 nm) directly bonded on Si or SiO2 plates.

In addition, the bonding surfaces can be diverse, for example chosen from semiconductors (Si, SiGe, Ge, III-V, etc.) conductors (Ni, Co, W, Ti, Ta, Pt, Pd, etc.) or insulators (SiO2, Si3N4, AlN, Al2O3, diamond, etc.) alone or in combination.

BRIEF DESCRIPTION OF THE DRAWINGS

This invention can be better understood on reading the description of examples of embodiments provided purely for indicative and non-limiting purposes, in reference to the appended drawings, in which:

FIGS. 5A and 5B show two acoustic microscopy images, one (FIG. 5A) after a standard heat treatment (400° C./2 h), and the other (FIG. 5B) after an additional slow-ramp heat treatment, and followed by the same standard heat treatment 400° C./2 h, FIG. 6 shows the change in the defect density at the interface, due to the degassing of the species, as a function of the temperature T of a bonding consolidation heat treatment, with a heat treatment according to the invention (squares), and without a heat treatment according to the invention (circles), FIG. 7 shows an acoustic microscopy image of the interface of an Si—Si bond after a heat treatment according to the invention and a consolidation heat treatment at 700° C. for 2 h, without defects.

Figure 1:
FIG. 1 shows a pair of substrates to be assembled.
Figure 1:
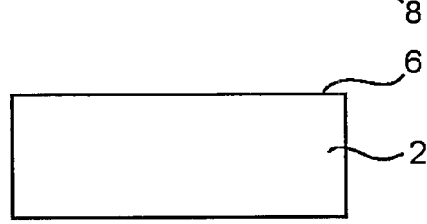

Identical, similar or equivalent parts of the various figures described below use the same numeric references for the sake of consistency between figures.

The various parts shown in the figures are not necessarily shown according to a uniform scale, in order to make the figures easier to read.

DETAILED DESCRIPTION OF SPECIFIC EMBODIMENTS

An example of an embodiment of the invention will be given in relation to FIG. 1, in which references 2 and 4 designate two substrates to be assembled, with respective assembly surfaces 6 and 8.

These are, for example, silicon plates, plain or covered with fine silicon oxide, with a thickness below 50 nm.

Surfaces 6 and 8 of the pair of substrates 2 and 4 may have been subjected, prior to the heat treatment according to the invention, to a preparation giving them a hydrophilic or hydrophobic character.

For example, a preparation of a surface with a hydrophilic character comprises a chemical treatment of the Sulfo-Peroxide Mixture (SPM) and/or Ammonium Peroxide Mixture (APM) type and/or a treatment enabling for example a cleaning, such as a (water and/or hydrocarbons) degassing heat treatment, and/or an activation of the surfaces by UV, and/or Ozone and/or by plasma, for example RIE or microwave, or ICP, etc., under various atmospheres.

The bonding can take place under various pressures, with or without thermalisation (the latter can be performed, for example, at between 200° C. and 300° C.).

According to another example, a preparation of a surface with a hydrophobic character comprises a surface deoxidation treatment; in the case of a silicon surface, it can be a HF liquid chemical attack.

Substrates 1 and 2 are assembled, one on the other, by the assembly faces 6 and 8 prepared before.

To improve the removal of species at the bonding interface, it is also possible to perform the bonding under a controlled atmosphere (vacuum or $N_2$ atmosphere), with or without thermalisation.

Once the bonding has been performed, the structure is subjected, according to the invention, to a heat treatment involving maintaining the temperature in the range of 50° C. to 100° C. for at least one hour. In this range, the temperature can change or be constant. For example, it can be equal to 100° C. for one hour, or change, starting at 50° C., according to a thermal ramp of 50° C./h, thus passing 100° C. after one hour (solid line 10 of FIG. 12).

The time passed between 50° C. and 100° C. can also be above 1 hour, or 1.5 h, or 2 h, or 2.5 h or 3 h.

The temperature is also maintained for at least one hour, at a temperature strictly above 100° C., and, for example, below 500° C.

An example of a treatment according to the invention involves at least maintaining the temperature in the range of 50° C. to 200° C. or between 100° C. and 200° C. or between 200° C. and 250° C., for at least one hour or two hours or three hours in order to satisfy the conditions set forth above (temperature between 50° C. and 100° C. for at least one hour and, for at least one hour, temperature strictly above 100° C., for example below 500° C.).

The system can previously have been subjected to treatments at higher or lower temperatures. Consequently, it is also possible to have a preliminary treatment at over 100° C. or 150° C. or 200° C., then a return of the temperature to between 50° C. and 100° C., and a treatment according to the invention in particular while maintaining the temperature in this range of 50° C. to 100° C. for at least one hour or two hours or three hours.

Such a treatment according to the invention can be followed by another treatment, for example at a higher temperature, in order to reinforce the bonding or fracturing of one of the substrates as explained below.

The treatment according to the invention led, aside from the maintenance of the temperature at between 50° C. and 100° C. for at least one hour, to bringing the system to higher temperatures, for example 200° C., and/or 300° C. and/or other temperatures (this is the case for treatments with levels as explained below). A treatment according to the invention can also be followed by a treatment at least at a temperature below the temperature of one of the levels.

A complementary treatment, of the bonding or fracture reinforcement type, does not necessarily immediately follow a treatment according to the invention. A step of another intermediate treatment may take place in the meantime.

Figure 12:
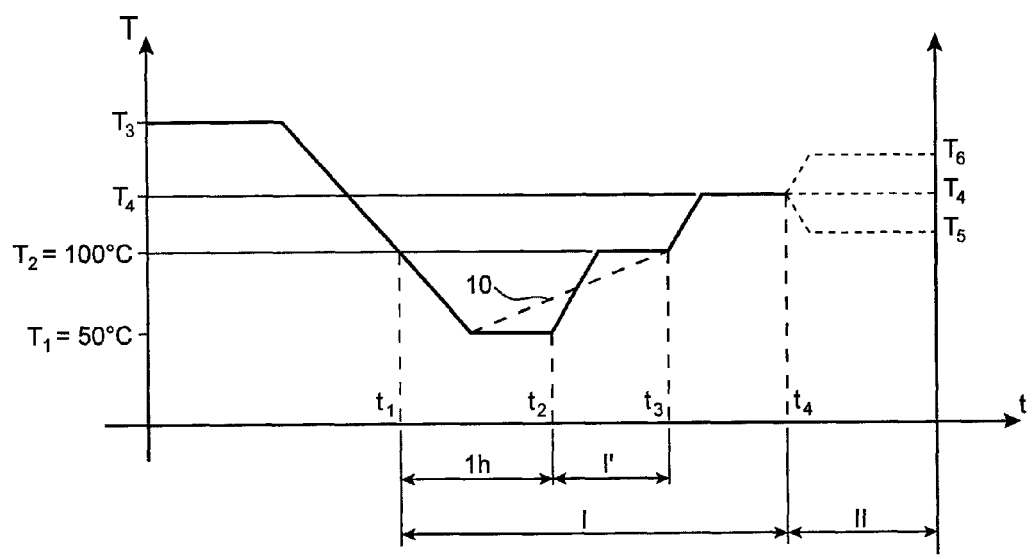

FIG. 12 shows an example of a treatment comprising:
  a preliminary treatment phase at a temperature T3, for example to perform the bonding,
  then a treatment according to the invention (phase I), comprising:
    a) maintaining the system for at least one hour at between 50° C. and 100° C. (in fact, the system is maintained in this temperature range for a period longer than one hour, since it is maintained at 100° C. also during phase I'),
    b) and, in the particular case represented, a treatment step at a temperature T4, above 100° C.,
    finally, a complementary treatment (phase II), for example to reinforce the bonding, at a temperature equal to, above (T6) or below (T5) one of the temperatures of the treatment according to the invention.

The treatment phase I according to the invention can comprise a ramp, shown with the dotted line in FIG. 12, during which the system slowly goes from 50° C. to 100° C. over at least one hour. The system is also maintained for at least one hour, at a temperature strictly above 100° C., as shown in the zone located in zone I, but beyond I' (between times t3 and t4), as well as zone II.

An example of a heat treatment according to the invention is in fact a treatment by levels.

Below, we will describe the levels of a heat treatment according to the invention as:
  successive, when one follows another, without returning to room temperature or to a lower temperature (for example shown diagrammatically in FIGS. 2 and 3),
  cumulative, when one follows another with a return, between two levels, to a lower temperature, for example room temperature (for example the treatment shown diagrammatically in FIG. 4).

The heat treatment according to the invention can consist of a combination of successive and/or cumulative levels.

For example, for Si—Si bondings, the low temperature of the levels of a heat treatment according to the invention will be below 200° C. and more advantageously below 150° C., for example, equal to or close to 50° C., then 100° C., then 125° C. or 145° C.

The steps or levels of a heat treatment according to the invention are long when their durations are more than one hour or two hours or, advantageously, more than five hours.

The duration of a level or a step of a heat treatment according to the invention includes both the duration of the increase from room temperature, the duration of maintaining the temperature of the level and the duration of decreases from the treatment level temperature to, for example, room temperature.

A heat treatment according to the invention, by levels, can involve, as in the treatments described above, maintaining the temperature within the range of 50° C. to 100° C. for at least one hour. In this range, the temperature can change, or be constant. For example, it can be equal to 100° C. for one hour or change, starting at 50° C., according to a thermal ramp of 50° C./h, thus passing 100° C. after one hour (dotted line 10 of FIG. 12).

The time passed between 50° C. and 100° C. can also be above 1 hour, or 1.5 h, or 2 h, or 2.5 h or 3 h.

Another treatment according to the invention, by levels, involves maintaining the temperature within the range of 50° C. to 200° C. or between 100° C. and 200° C., or between 200° C. and 250° C., for at least one hour or two hours or three hours. We will also seek to satisfy the conditions set forth above (temperature for at least one hour between 50° C. and 100° C. and, for at least one hour, strictly above 100° C., and for example below 500° C.).

According to an example, a treatment of the two substrates 2 and 4 of FIG. 1 comprises successive temperature levels at low temperatures.

Figure 2:
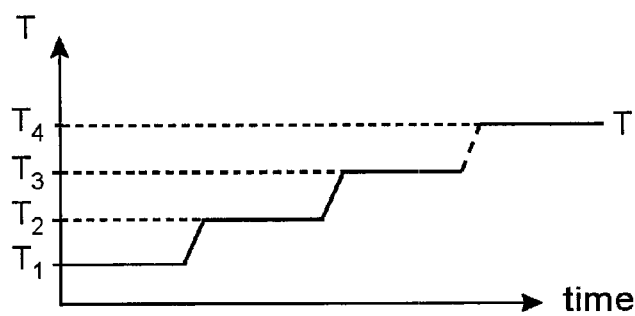
FIGS. 2 to 4 and 12 show various changes in temperature as a function of time for various heat treatment processes according to this invention.

For example, this treatment is performed for a period of around 5 hours for each level, and successively at increasing temperatures. A first level can be T1=50° C., a second T2=100° C., a third T3=150° C., and a fourth T4=200° C. The change in temperature as a function of time is shown in FIG. 2. It is then possible to progress further by levels of 100° C., until reaching a temperature, T, of a bonding reinforcement heat treatment.

Figure 3:
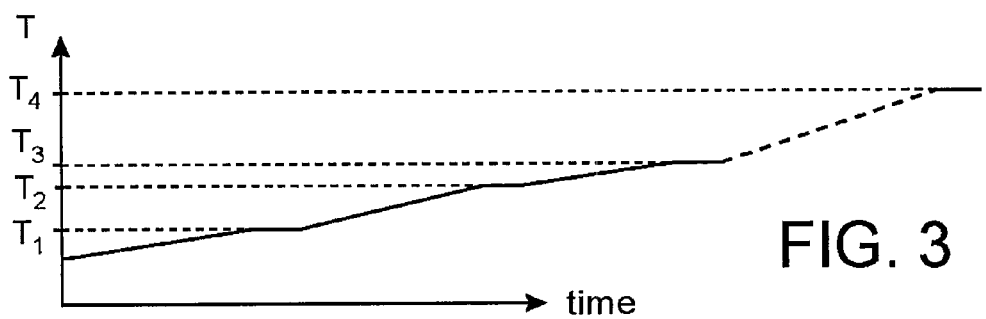

According to an alternative, it is possible to implement a very slow temperature increase ramp making it possible to very gradually raise the temperature to the levels T1, then T2, then T3, then T4, for example with a slope of 1° C./min, or even advantageously 0.1° C./min. Advantageously, the temperature is maintained at successive heat levels T1, T2, T3 and T4, starting at low temperatures, for example at 100° C., with each level being maintained, for example, for 10 hours. Such a treatment is shown in FIG. 3.

One or more heat treatments can thus be defined, all enabling a total heat treatment according to the invention.

A heat treatment according to the invention, by successive or cumulative levels, can be followed by a heat treatment reinforcing the assembly of the two substrates, for example at a temperature above that of the heat treatment levels according to the invention.

Figure 4:
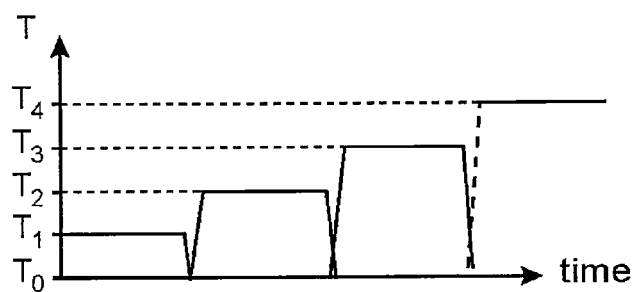

Another treatment according to the invention is shown in FIG. 4: levels are set at temperatures T1, T2, T3 and T4, with returns, between each level, to a lower temperature T0, for example room temperature, for example at 20° C.

Thus, a cumulative heat treatment can have the following form, starting at room temperature (for example: 20° C.):
  a first level for a period of 2 hours at 50° C., followed by a return to a lower temperature (for example: room temperature),
  then a second level for 2 hours at 100° C., followed by a return to a lower temperature (for example: room temperature),
  then a third level for 2 hours at 150° C., followed by a return to a lower temperature (for example: room temperature),
  then a fourth level for 2 hours at 200° C., followed by a return to a lower temperature (for example: room temperature),
  then a standard bonding reinforcement heat treatment at a temperature T, for example 400° C., for 2 hours.

Another example of a heat treatment according to the invention is a ramp bringing the temperature of the system progressively from room temperature to a final temperature, which ramp is such that a period of at least one hour is passed in the range of 50° C. to 100° C. The duration passed between these two temperatures can also be above 1 h, or 1.5 h, or 2 h, or 2.5 h or 3 h. The treatment is then completed by the treatment steps according to the invention (maintaining the temperature in the range strictly above 100° C. and below or equal to 500° C. for at least one hour).

Heat treatments according to the invention have been carried out with a wet chemical hydrophilic surface preparation (SPM and APM).

The effects of the various heat treatments according to the invention can be compared in terms of defect density.

1) in the first case (table 1), the following were compared:
  a heat treatment according to the invention, of the type of FIG. 3, with a slow ramp of 1° C./min, starting at room temperature, with levels each lasting 10 h, at 100° C., then at 200° C., then at 300° C., and finally at 400° C., and a bonding reinforcement heat treatment, referred to as the "standard" treatment, which is quasi-isothermal at 400° C.

Table I shows a defect density at the bonding interface that is clearly lower than in the case of the treatment according to the invention.

The images shown in FIGS. 5A and 5B are images of the bonding interface obtained by acoustic microscopy. In FIG. 5A, it is an image after the "standard" heat treatment alone. In FIG. 5B, it is an image after the heat treatment according to the invention and after the same standard heat treatment as that of FIG. 5A. FIG. 5B shows, with respect to FIG. 5A, an improvement, with the treatment according to the invention, of the defectiveness, by a factor greater than 8 (FIGS. 5A and 5B relate to the results of table I).

The repair of bonding defects, at high temperature (for example above 1100° C.) is therefore largely facilitated in a preliminary application of a treatment according to the invention.

When such a high-temperature repair treatment is not possible, for example due to the presence of components in one of the substrates, the treatment according to the invention makes it possible to considerably limit the defect density in the final assembly.

TABLE I

| | Defect density at the bonding interface |
|---|---|
| Standard heat treatment alone (400° C./2 h). | 88% |
| Additional heat treatment with slow ramp before the standard treatment at 400° C. | 10.60% |

2) in the second case, the following were compared:
  a heat treatment according to the invention, consisting of long successive levels lasting hours at 50° C./min, followed by 5 hours at 100° C., followed by 5 hours at 150° C., followed by a heat treatment at temperature T (bonding reinforcement temperature),
  and a standard quasi-isothermal heat treatment at temperature T=200° C. (or 300° C. or 400° C.) for around 2 hours, for reinforcement of the interface.

An improvement in the defectiveness by at least a factor of 4 is noted owing to the heat treatment according to the invention, and for each standard interface reinforcement heat treatment temperature (at 200° C. or 300° C. or 400° C.).

FIG. 6 shows the change in defect density as a function of the annealing temperature, with a treatment according to the invention (squares) and without a treatment according to the invention (circles). The example is that of an Si—Si bond, with a wet chemical preparation (SPM, APM).

Other application examples can be given.

EXAMPLE 1

By optimising the preliminary surface preparations, for example by preparing surfaces 6 and 8 by microwave plasma in an oxygen atmosphere and producing a bond between the two surfaces under vacuum with heating to 300° C. during the bonding, it was possible to obtain an Si—Si bond, without defects at the bonding interface (as shown in FIG. 7) under the following conditions:

a heat treatment according to the invention is first performed, which treatment comprises a slow ramp of 1° C./min, starting at room temperature, then having levels of a duration of 10 hours each at 100° C., then at 200° C., then at 300° C., and so on by levels of 100° C. until reaching the final temperature of 700° C., a "standard" bonding reinforcement heat treatment, in the range of 600 to 700° C.

FIG. 7 shows an acoustic microscopy image of this Si—Si bonding interface, after heat treatment by levels according to the invention, followed by a consolidation treatment at 700° C. for 2 hours. This interface is free of defects.

EXAMPLE 2

By chemically preparing the surfaces, for example with an attack by HF in solution, so that they become hydrophobic, it was possible, with a heat treatment according to the invention, to obtain defect-free bonding interfaces at up to 500° C. and more. The heat treatment according to the invention is a slow ramp, of 0.15° C./min, starting at room temperature, combined with levels, each lasting 10 hours, at 100° C., then at 200° C., then at 300° C., and so on by levels of 100° C. until reaching the final temperature of 500° C.

Various other applications of a process according to the invention can be mentioned.

The use of additional heat treatments according to the invention makes it possible to produce stacked structures by molecular bonding with minimal or even no bonding defects. Among the various applications, it is then possible to produce thin films (for example below 100 μm or 1 μm or 0.1 μm) is possible.

For example, the initial structure is obtained by bonding two thick plates 2 and 4 (FIG. 1), followed by a heat treatment by levels according to the invention, and optionally a reinforcing heat treatment. It is then possible to use mechanical thinning technology (lapping, grinding, etc.) and/or a chemical thinning technique (chemical attack, lift off, etc.) and/or other techniques alone or in combination. The structure of FIG. 10 is then obtained with a substrate 2 and a thin film 40.

Figure 11A:
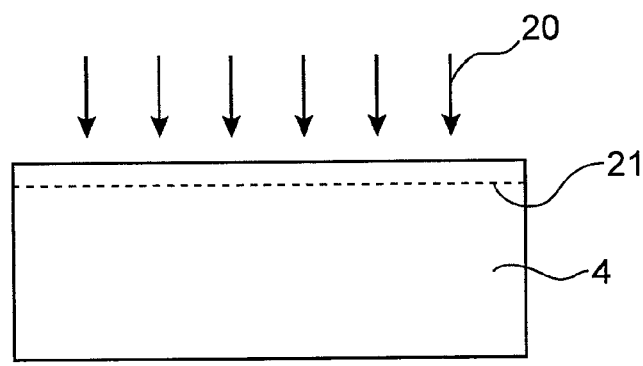
FIGS. 11A and 11B show steps of a process for obtaining a structure as shown in FIG. 10.

According to another example, at least one of the two thick plates 2, 4 has a crystalline surface structure, implanted with a species such as a gaseous species, for example by ion implantation, in order to generate a weakness zone 21 (FIG. 11A). Then a heat treatment by levels according to the invention is carried out, and optionally a reinforcing heat treatment.

Figure 10:
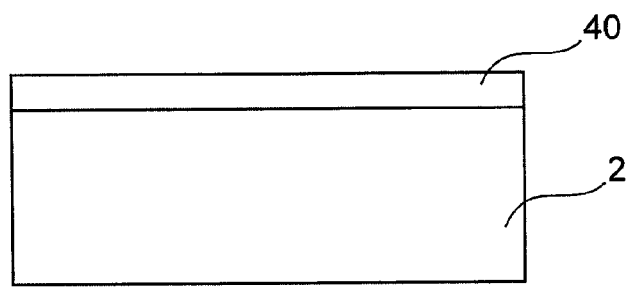
FIG. 10 shows a thin film on a substrate.
Figure 11B:
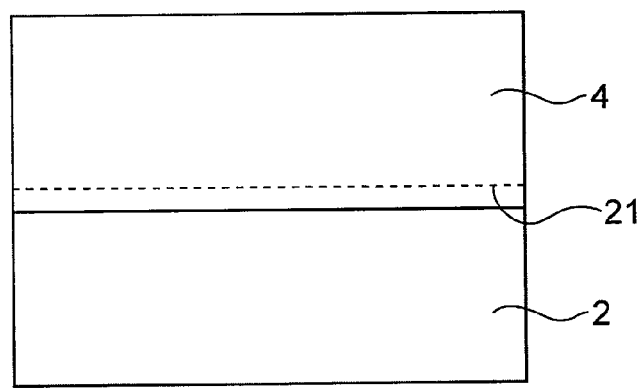

It is then possible to use the technology known as "Smart Cut" (registered trademark): after the bonding of the two thick plates (FIG. 11B), a separation is caused, for example in a heat treatment, at the level of the weakness zone 21, and the thin film 40, which remains adhered to the plate 2, is detached (FIG. 10).

The process according to the invention can also advantageously be used in the following fields of application:

1. Productions of stacked structures by molecular adhesion, including thin or ultra-thin layers, with a thickness for example below 2 μm or even 0.1 μm, for example; the production of silicon-on-insulator (SOI) structures with films of silicon and fine buried oxides (BOX). In particular, the thickness of the oxide at the bonding interface is typically below 50 nm. Since the oxide does not have the ability to absorb the degassing products of the bonding, the heat treatments according to the invention enable these products to disappear without damaging the bonding interface.

2. The production of certain heterostructures, obtained by direct bonding, which poorly withstand, or do not withstand, high-temperature repair heat treatments, for example:

two substrates 2, 4 made of materials with excessively different expansion coefficients, for example with a ratio above 2 and of which the bonding cannot withstand heat treatments at high temperatures; this is the case, for example, of silicon on sapphire, of which the heat expansion coefficients are respectively $2.5 \times 10^{-6}$ K$^{-1}$ and $7 \times 10^{-6}$ K$^{-1}$, two substrates or plates 2, 4 made of materials presenting a risk of diffusion of an element through the bonding interface; this is, for example, the case of two plates 2, 4 made of differently doped semiconductor materials (example: silicon); according to an example, one is doped with boron and the other is doped with phosphorus, two substrates or plates 2, 4 to be stacked, capable of being degraded by a high-temperature heat treatment; for example, one of the plates is already partially processed, or already has components, and cannot therefore be exposed to a temperature above 450° C. (the case of a metal layer of a component on silicon).

The process according to the invention can also advantageously be used in the following application.

Figure 8:
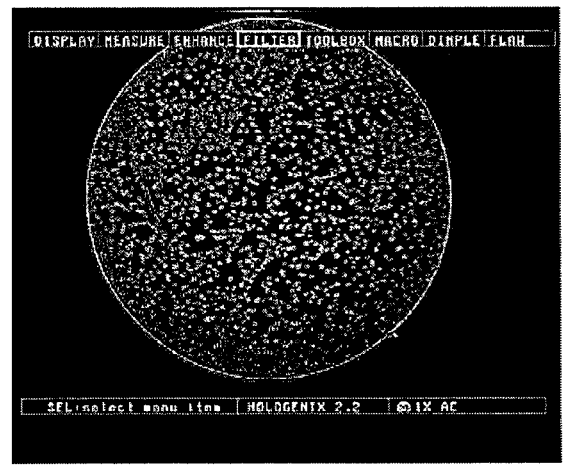
FIG. 8 is an example of defectiveness observed in interferometry for structures having thin films treated only by a "standard" process.

According to the usual processes described as "standard", the production of thin-layer films can be complex when the thickness of the films becomes very low, on the order of several nanometres, or between 1 nm and 10 μm. Indeed, production defects appear on or in the films produced (holes, folds, bubbles/blisters, etc.) in the production of films or in annealings that make it possible to stabilise the new structures produced. FIG. 8 is an example of defectiveness observed with a "Magic Mirror" apparatus of Hologenix, for structures of thin films treated by the "standard" process. Several hundred defects make the structure industrially "unusable".

This problem concerns in particular the production of SOI (silicon-on-insulator: structure Si/SiO2/Si) materials; it also concerns the production of SIS (semiconductor-insulator-support) materials comprising a thin semiconductor layer (from several nanometres, for example 5 nm, to several μm, for example 5 μm or 10 μm, in thickness), which conducts the electric current according to certain electrical conditions (voltage/current, for example), on an insulator. The latter makes it possible to insulate the thin layer semiconductor from the underlying support (SiO2, Si3N4, diamond, etc.). The support makes it possible to maintain the preceding two thin layers stacked in order to create the final industrialised structure.

According to the invention, the defect problems inherent to the so-called "standard" process are solved.

In the case of a heat treatment inducing a fracture, the temperature at which the plates are put in the detachment oven is carefully chosen: advantageously, the plates will be introduced at a temperature above room temperature, for example 50° C. or 80° C. or 100° C., or between 50° C. and 80° C. or between 80° C. and 100° C., for example at the temperature of the first temperature level in a heat treatment by levels, for example at 50° C. or 80° C. or 100° C. The use of a relatively long time, on the order of at least 3 hours or at least 4 hours or at least 5 hours, at one or more relatively low temperature(s), for example on the order of 50° C. or 80° C. or 100° C. or 150° C., or for example between 50° C. and 80° C. or between 80° C. and 100° C. or between 100° C. and 150° C. makes it possible to reduce the number of defects for plates subjected to plasma activation before bonding.

The substrate fracture can be obtained using the Smart Cut™ or substrate fracture technology, described, for example, in "Silicon Wafer Bonding Technology", edited by S S Iyer and A J Auberton-Hervé, INSPEC, Institute of Electrical Engineers, London, 2002, Chapter 3, p. 35 and following, by B. Aspar and A. J. Auberton-Hervé, in the following way:

It is possible first to implant a dose much higher than that generally required—at least 20% higher (for example a dose of $8 \times 10^{16}$ $H^+ \cdot cm^{-2}$ for the hydrogen implanted in the silicon oxide, whereas the usual process uses only $5 \times 10^{16}$ $H^+ \cdot cm^{-2}$). It is then possible to use the annealing previously described, with a placement in a low-temperature oven (below 100° C.). Slow and long temperature increase ramps (0.25° C./min for example) enable the thin film structure of the "Smart Cut" type to be released at a lower temperature than the usual process (for example in the case of hydrogen in silicon at a temperature below 400° C., for example 300° C., whereas the fracture normally occurs at 500° C.).

This process (overdose of the species implanted at depth for transfer to a lower temperature for slow and long annealing) makes it possible to produce a structure several nanometres in thickness with a minimum number of defects.

The fracture is therefore obtained at a lower temperature than for the standard process. It is therefore possible to produce, for example at temperatures below, or on the order of, 400° C., for example 300° C., a fracture in structures that are not compatible with the usual fracture temperatures (around 500° C.). This is the case in particular for a processed structure (i.e. comprising, in or on the thin film to be transferred or the receiving substrate, all or some electronic components (CMOS, for example) or others (MEMS, MOEMS, etc.) or comprising metal interconnections, etc.).

Figure 9:
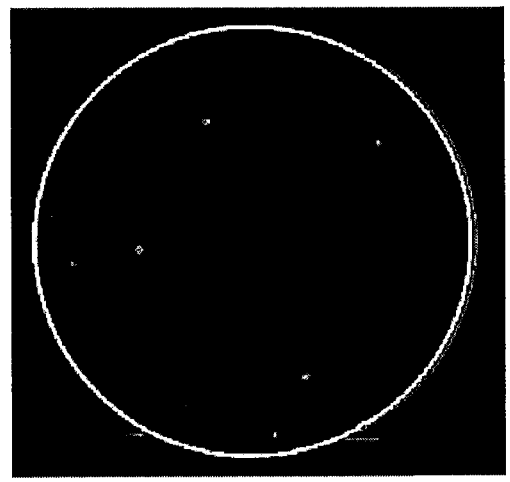
FIG. 9 is an example of defectiveness observed in interferometry for a structure having a thin film obtained by a process according to the invention.

Thus, in FIG. 9, it is noted that a thin layer obtained by a process according to the invention contains fewer than 10 defects, whereas more than one thousand defects are observed in the "standard" process (FIG. 8).

Consequently, according to an embodiment of the invention, favourable ion implantation conditions are selected: overdosed implanted species, for example at a dose above the minimum dose enabling a fracture (above $6 \times 10^{16}$ $H^+ \cdot cm^{-2}$ or $7 \times 10^{16}$ $H^+ \cdot cm^{-2}$, for example, for hydrogen). These conditions make it possible, at low temperature, to produce structures having very low film thicknesses (of several nanometres) with a considerably reduced defect density, from several hundred or several thousand to just several units, or even without defects.

It is thus possible to produce thin film structures (semiconductor, for example) on a thin film (insulator or not), all on a support.

An example of the use of an annealing process is as follows. As explained above, it is sought to overdose an ion or atom implantation in order to produce a fracture at a lower temperature than in the known processes.

According to this example, a silicon oxide plate is implanted with $H^+$ ions at a dose of $8 \times 10^{16}$ $H^+ \cdot cm^{-2}$ and an energy of 50 keV.

It is bonded to another Si plate, by an oxide layer, and a Si/SiO$_2$/Si structure is thus obtained, for example with an oxide thickness of 12 nm.

Then, the following annealing cycle is carried out:
the temperature is initially 100° C., then the isotherm 100° C. is maintained for 10 hours,
a ramp at 0.25° C./min is then produced, until reaching the isotherm 200° C., maintained for 10 hours,
a ramp at 0.25° C./min is then produced, until reaching the isotherm 300° C., maintained for 10 hours,
again a ramp at 0.25° C./min is produced until reaching the isotherm at 400° C., maintained for 10 hours; the fracturing of the substrate is produced during this step,
again a ramp at 0.25° C./min is produced, and an output temperature of 200° C. is reached.

According to an alternative, an implantation is performed with a dose of $8 \times 10^{16}$ $H^+ \cdot cm^{-2}$ at 76 keV, which will enable the transfer of 700 nanometres of Si.

The annealing cycle is as follows:
the temperature is initially at 100° C., then the isotherm is maintained at 100° C. for 10 hours.
a ramp at 0.25° C./min is then produced, until reaching the isotherm 200° C., maintained for 10 hours,
a ramp at 0.25° C./min is then produced, until reaching the isotherm 300° C., maintained for 15 hours; the fracturing of the substrate is performed before this step,
again a ramp at 0.25° C./min is produced, and an output temperature of 200° C. is reached.

According to yet another example, an implantation is produced at a dose of $6 \times 10^{16}$ $H^+$ ions at 210 keV through a thermal oxide, which will enable the transfer of 1.56 μm of Si.

Two plates or substrates 2 and 4 of silicon are selected, of which one is oxidised at the surface, for example over a thickness of 0.4 μm. This oxidised plate is then implanted with $H^+$ ions, with the dose and energy indicated above, then it is deoxidised. The implanted zone forms a fracture zone such as zone 21 of FIG. 11A, which will subsequently enable a thin layer to be separated from the remainder of the substrate.

The two plates are then cleaned by RCA chemistry and their surface is activated by plasma.

The plates are then placed under vacuum ($10^{-3}$ mbar) with a temperature increase to 300° C. (heat ramp of 20° C./min). They are maintained at this temperature for 10 minutes.

The bonding is then induced at this temperature for a period of two hours, then the system is returned to room temperature.

A treatment according to the invention is then applied, with a temperature ramp of 1° C./min, starting at room temperature, up to 100° C. The following is then performed:
the temperature is maintained at 100° C. for 10 hours,
then a level at 200° C. for 10 hours,
then a level at 300° C. for 10 hours,
then a level at 400° C. for 10 hours.

The fracture treatment is then induced during the final level at 400° C., resulting in a transfer of a silicon film of 1.56 μm.

In this example, the system is subjected, before the heat treatment according to the invention, to a treatment at a temperature above 100° C.

The invention also relates to the case of "standard" implantation doses (and therefore not only overdose cases as in the examples already provided); a heat treatment according to the invention then has an interest in the implementation of the "Smart Cut®" process, by limiting the number of defects. An example will be provided, which shows the detachment annealing of bonded plates, for a transfer according to the "Smart Cut®" process:

the silicon donor plate has an oxide layer on the order of 50 nm of thickness, it is activated by an O2 plasma treatment at 535 W for 45 s, it is implanted with hydrogen at a dose on the order of $10^{16}$ $H^+$ ions/cm2 and an energy on the order of 30 keV, the detachment annealing is performed by exposing the plates to a temperature of around 100° C., for at least 5 hours, then an increase in temperature by 0.5° C./min to 200° C., then maintaining the temperature at 200° C. for 2 hours, and, finally, increasing the temperature by 0.5° C./min to 500° C.

The transfer of the layer to the receiving plate is thus performed with fewer than 5 pinhole-type defects.

In all of the experiments and examples described, no additional mechanical force is applied to create the fracture of the implanted substrate.

The invention claimed is:

1. Process for producing a bond between a first substrate having a first surface and a second substrate having a second surface, comprising:
   a) a step of preparing the first surface and the second surface to be assembled,
   b) attaching the first surface and the second surface to form an assembly of these two surfaces, by direct molecular bonding,
   c) heat treating the assembly, including a step of maintaining the temperature within the range of 50° C. to 100° C. for at least one hour, then a step of maintaining the temperature in the range strictly above 100° C. and below or equal to 500° C. for at least one hour, thereby limiting or avoiding defects at an interface of the first substrate and the second substrate.

2. Process according to claim 1, said step c) comprising a passage through successive and/or cumulative temperature levels.

3. Process according to claim 2, said temperature levels being successive, without a return to room temperature.

4. Process according to claim 2, said temperature levels being cumulative, with, between two successive temperature levels, a return to a temperature below the temperatures of two levels.

5. Process according to claim 4, the lower temperatures between two successive levels being all identical.

6. Process according to claim 5, the lower temperatures between two successive levels being all equal to room temperature.

7. Process according to claim 2, the temperature levels being produced at temperatures increasing over time.

8. Process according to claim 2, at least one of the temperature levels comprising a rate of temperature increase below 5° C. per minute.

9. Process according to claim 1, said step of preparing the first surface and the second surface being a hydrophilic or hydrophobic treatment step.

10. Process according to claim 1, said assembly being produced by bonding, under a controlled atmosphere.

11. Process according to claim 1, at least one of the two substrates being a semiconductor material.

12. Process according to claim 1, at least one of the two substrates being made of silicon.

13. Process according to claim 1, the two substrates being made of silicon.

14. Process according to claim 1, the two substrates at least having a silicon dioxide surface.

15. Process according to claim 1, one of the two substrates having at least a surface of silicon dioxide and the other is silicon.

16. Process according to claim 1, the two substrates being made of materials with different heat expansion coefficients.

17. Process according to claim 1, at least one of the two substrates comprising at least one component.

18. Process according to claim 1, the bonding being performed under a controlled atmosphere, under controlled pressure, with or without thermalisation.

19. Process according to claim 1, the temperature at the end of step c) being a heat treatment temperature for reinforcing molecular bonding and/or inducing a fracture in a substrate.

20. Process according to claim 1, also comprising a step:
   d) of reinforcing the bonding by molecular adhesion and/or inducing a fracture in a substrate.

21. Process according to claim 20, step d) being performed by a heat treatment at a temperature above the temperatures of step c).

22. Process according to claim 20, wherein, during step c), the system is brought, for example by one or more temperature levels, to a temperature above 100° C., with step d) being performed at least at a temperature above, or equal, or below this temperature above 100° C.

23. Process for producing a thin film on a first substrate, comprising a process for producing a bond between the first substrate and the second substrate according to claim 1, then a step of thinning the second substrate.

24. Process according to claim 23, the thinning step being performed by chemical and/or mechanical thinning.

25. Process according to claim 24, the thinning step being performed by fracturing the second substrate.

26. Process according to claim 24, the second substrate being pre-implanted by one or more atomic or ionic species in order to create in it a weakness zone.

27. Process according to claim 26, the atomic or ionic species being implanted at a dose above the minimum dose enabling the fracture, which is performed at a temperature below or equal to the temperature normally associated with the minimum dose.

28. Process according to claim 27, the fracture being performed at one or more temperature(s) between 50° C. and 150° C., for at least 3 hours.

29. Process according to claim 27, the ionic species, $H^+$, being implanted in silicon at a dose above $6 \times 10^{16}$ $H^+ \cdot cm^{-2}$.

30. Process according to claim 23, the thin film obtained having a thickness below 1 μm or 100 nm or 50 nm.

31. Process for producing a bond between a first substrate having a first surface and a second substrate having a second surface, comprising:
   a) a step of preparing the first surface and the second surface to be assembled,
   b) attaching the first surface and the second surface to form an assembly of these two surfaces, by direct molecular bonding,
   c) heat treating the assembly, including a step of maintaining the temperature within the range of 50° C. to 100° C. for at least one hour, then a step of maintaining the temperature, in the range strictly above 100° C. and below or equal to 500° C. for at least one hour, thereby limiting or avoiding defects at an interface of the first substrate and the second substrate, d) following step c, a step of inducing a fracture in one of said substrates.

* * * * *